(12) United States Patent
Morimoto et al.

(10) Patent No.: US 8,400,460 B2
(45) Date of Patent: Mar. 19, 2013

(54) IMAGE DATA PROCESSING METHOD, PROGRAM FOR IMAGE DATA PROCESSING METHOD, RECORDING MEDIUM WITH RECORDED PROGRAM FOR IMAGE DATA PROCESSING METHOD AND IMAGE DATE PROCESSING DEVICE

(75) Inventors: Hirofumi Morimoto, Kanagawa (JP); Tetsuo Kaneko, Kanagawa (JP)

(73) Assignee: Sony Corporation, Tokyo (JP)

( * ) Notice: Subject to any disclaimer, the term of this patent is extended or adjusted under 35 U.S.C. 154(b) by 653 days.

(21) Appl. No.: 12/374,114

(22) PCT Filed: Jun. 20, 2007

(86) PCT No.: PCT/JP2007/062833
§ 371 (c)(1),
(2), (4) Date: Jan. 16, 2009

(87) PCT Pub. No.: WO2008/029550
PCT Pub. Date: Mar. 13, 2008

(65) Prior Publication Data
US 2009/0322772 A1 Dec. 31, 2009

(30) Foreign Application Priority Data
Sep. 6, 2006 (JP) .................................. 2006-240963

(51) Int. Cl.
*G09G 5/36* (2006.01)
(52) U.S. Cl. ...................................................... 345/557
(58) Field of Classification Search .................. 375/240; 382/233; 345/557
See application file for complete search history.

(56) References Cited

U.S. PATENT DOCUMENTS

| | | | |
|---|---|---|---|
| 4,315,312 A * | 2/1982 | Schmidt ........................ | 711/172 |
| 6,353,876 B1 * | 3/2002 | Goodwin et al. ............. | 711/143 |
| 7,275,143 B1 * | 9/2007 | Simeral et al. ................ | 711/202 |
| 7,965,773 B1 * | 6/2011 | Schlanger et al. ........ | 375/240.16 |
| 2004/0268051 A1 * | 12/2004 | Berg et al. ..................... | 711/137 |
| 2006/0023789 A1 | 2/2006 | Yamashita et al. | |
| 2006/0050976 A1 * | 3/2006 | Molloy ........................ | 382/233 |
| 2006/0184737 A1 * | 8/2006 | Yamada ....................... | 711/118 |
| 2007/0208919 A1 | 9/2007 | Tanaka et al. | |

FOREIGN PATENT DOCUMENTS

| | | |
|---|---|---|
| EP | 1 736 883 A1 | 12/2006 |
| EP | 1 775 962 A1 | 4/2007 |
| JP | 6 231035 | 8/1994 |
| JP | 11 215509 | 8/1999 |
| JP | 2006 31480 | 2/2006 |
| WO | 2005/104027 A2 | 11/2005 |
| WO | 2005/104027 A3 | 11/2005 |
| WO | 2005 109205 | 11/2005 |

\* cited by examiner

*Primary Examiner* — Ke Xiao
*Assistant Examiner* — Kyle Zhai
(74) *Attorney, Agent, or Firm* — Oblon, Spivak, McClelland, Maier & Neustadt, L.L.P.

(57) ABSTRACT

The present invention is applied to a coding device and a decoding device for moving image data in compliance with, for example, an MPEG-4AVC/ITU-T H. 264 system, in which address data is issued to specify an area that is a plurality of read units in a horizontal direction and a vertical direction, respectively, and reference image data is stored in a cache memory.

18 Claims, 16 Drawing Sheets

MOTION VECTOR
RETRIEVAL RANGE

MOTION VECTOR
RETRIEVAL RANGE

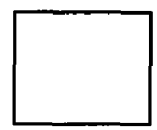
16×16
16×8
FIG. 22A    FIG. 22B
FIG. 23B    FIG. 23D    FIG. 23F
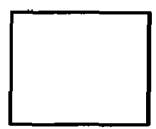  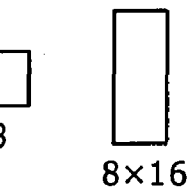  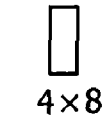  
16×16    16×8            8×8    4×8    8×4    4×4
                8×16
FIG. 23A    FIG. 23C    FIG. 23E    FIG. 23G

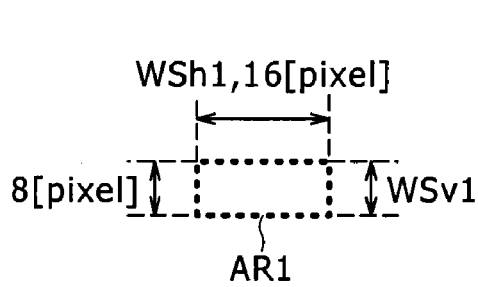 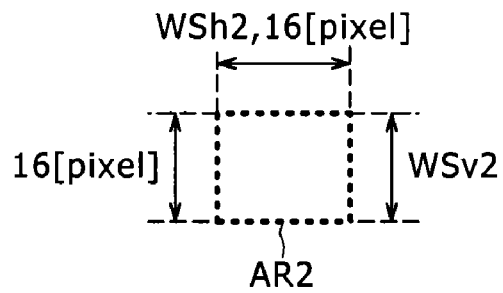
FIG. 24A  FIG. 24B
FIG. 25
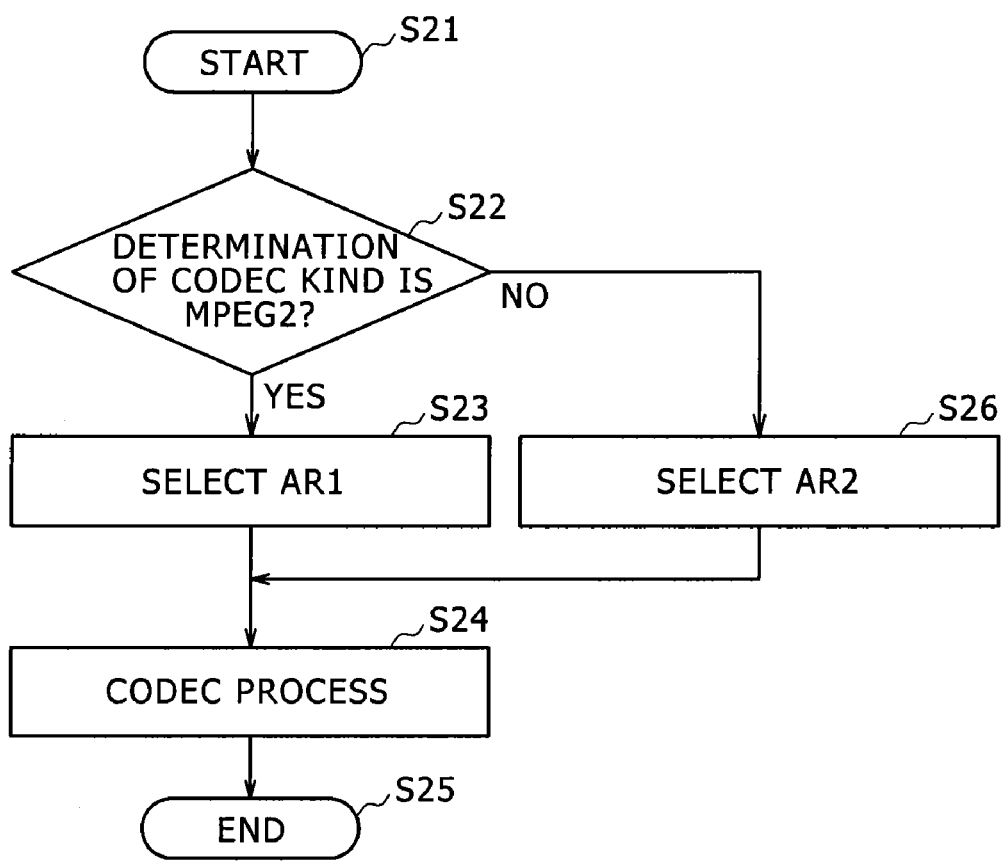

IMAGE DATA PROCESSING METHOD, PROGRAM FOR IMAGE DATA PROCESSING METHOD, RECORDING MEDIUM WITH RECORDED PROGRAM FOR IMAGE DATA PROCESSING METHOD AND IMAGE DATE PROCESSING DEVICE

BACKGROUND OF THE INVENTION

1. Technical Field

The present invention relates to an image data processing method, a program for the image data processing method, a recording medium with the program for the image data processing method recorded, and an image data processing device, and is capable of being applied to a coding device and a decoding device for moving image data in compliance with, for example, an MPEG-4AVC/ITU-T H. 264 system. In the present invention, address data is issued to specify areas that are a plurality of read units in a horizontal direction and a vertical direction, respectively, and reference image data is stored in a cache memory, thereby making it possible to reduce access frequencies of a memory bus while reducing a capacity of the cache memory.

2. Background Art

Up to now, in a coding process in compliance with for example, H. 264/MPEG-4AVC, moving image data that has been coded is decoded and held in a frame memory, and moving image data in a subsequent frame is coded with reference to the moving image data held in the frame memory. Also, in response to this, in a decoding process, the decoded moving image data is held in the frame memory, and the moving image data in the subsequent frame or the like is decoded with reference to this moving image data.

That is, FIG. 1 is a block diagram showing a coding device of the MPEG-4AVC/ITU-T H. 264 system. A coding device 1 conducts a coding process on input image data D1 to generate an output stream D2.

Here, the coding device 1 sequentially inputs the input image data D1 to a subtraction section 2 in the order according to a GOP structure. The subtraction section 2 subtracts a predicted value that is output from a selection section 3 from the input image data D1 to output a predicted error value. A discrete cosine transform section 4 conducts a discrete cosine transform process on the predicted error value to output coefficient data. A quantization section 5 quantizes and outputs the coefficient data. An entropy coding section 6 conducts a variable length coding process on the output data of the quantization section 5, and outputs the output data. The coding device 1 adds various control codes, a motion vector MV, or the like to the output data of the entropy coding section 6 to generate the output stream D2.

An inverse quantization section 7 conducts an inverse quantization process on the output data of the quantization section 5 to decode the output data of the discrete cosine transform section 4. An inverse discrete cosine transform section 8 conducts an inverse discrete cosine transform process on the output data of the inverse quantization section 7 to decode the output data of the subtraction section 2. An addition section 9 adds the predicted value that is output from the selection section 3 to the output data of the inverse discrete transform section 8 to decode the input image data D1. A deblocking filter 10 removes block distortion from the input image data D1 that has been decoded by the addition section 9 to output the data.

A reference image memory 11 holds image data D3 that is output from the deblocking filter 10 as reference image data to output the data to a motion compensation section 12. A motion vector detection section 13 detects the motion vector MV from the input image data D1 to output the motion vector in an inter-frame coding process. The motion compensation section 12 motion-corrects the reference image data with the motion vector MV to output the data in the inter-frame coding process. A weighting prediction section 14 weights and adds the image data that is output from the motion compensation section 12 to generate a predicted value in the inter-frame coding process.

An in-screen prediction section 15 generates a predicted value in the in-frame coding process according to the output data of the addition section 9 to output the predicted value. The selection section 3 selects a predicted value that is output from the weighting prediction section 14 or a predicted value that is output from the in-screen prediction section 15 to output the selected predicted value to the subtraction section 2. A coding control section 17 controls the operation of the respective sections so as to set a code quantity of the output stream D2 to a given target value.

In the above coding process and the decoding process, when a configuration of a cache memory is applied to the reference image memory 11, it is conceivable that the image data can be coded or decoded at a further high speed.

As for the above cache memory, JP-A No. 2006-31480 discloses a configuration where in a sub-processor that decodes a compressed image, when data is transferred from a main memory to the cache memory, a memory area that executes caching on the basis of a parameter expressing the feature of an image is adaptively changed, thereby increasing a probability of hitting caching in a subsequent process.

Also, JP-A No. H11-215509 discloses a configuration in which data in an area adjacent to a right side of a reference area indicated by a motion vector of a present macroblock is preloaded in the cache memory, thereby increasing a cache hit rate.

However, the above techniques suffer from a problem that when a capacity of the cache memory is reduced, the cache hit rate is reduced, and access frequencies of a memory bus are increased although the cache hit rate is improved.

DISCLOSURE OF INVENTION

The present invention has been made in view of the above-mentioned circumstances, and it is an object of the present invention to propose an image data processing method, a program for the image data processing method, a recording medium with the program for the image data processing method recorded, and an image data processing device, which are capable of reducing access frequencies of a memory bus while reducing a capacity of a cache memory.

In order to solve the above problem, the present invention is applied to an image data processing method in which a cache memory is used, a predicted value is generated according to reference image data that is held in a reference image memory, and moving image data is coded and/or decoded with the aid of the predicted value, including: a reference image data request step of specifying an area of the reference image data on a screen by one-dimensional address data of the reference image memory, and requesting the reference image data that is used for generation of the predicted value from the cache memory; a cache memory retrieval step of retrieving reference image data corresponding to the request from the reference image data that is stored in the cache memory; a first reference image data output step of outputting the reference image data that is stored in the cache memory in response to the request when the corresponding reference image data is stored in the cache memory; and a second reference image data output step of storing the corresponding reference image data that is stored in the reference image memory in the cache memory, and also outputting the corresponding reference image data in response to the request when the corresponding reference image data is not stored in the cache memory, wherein the reference image memory outputs the reference image data in a read unit of a plurality of pixels which are continuous in a horizontal direction or a vertical direction, and wherein the area is an area that is a plurality of the read units in the horizontal direction and the vertical direction, respectively.

Also, the present invention is applied to a program for an image data processing method in which a cache memory is used, a predicted value is generated according to reference image data that is held in a reference image memory, and moving image data is coded and/or decoded with the aid of the predicted value, including: a reference image data request step of specifying an area of the reference image data on a screen by one-dimensional address data of the reference image memory, and requesting the reference image data that is used for generation of the predicted value from the cache memory; a cache memory retrieval step of retrieving reference image data corresponding to the request from the reference image data that is stored in the cache memory; a first reference image data output step of outputting the reference image data that is stored in the cache memory in response to the request when the corresponding reference image data is stored in the cache memory; and a second reference image data output step of storing the corresponding reference image data that is stored in the reference image memory in the cache memory, and also outputting the corresponding reference image data in response to the request when the corresponding reference image data is not stored in the cache memory, wherein the reference image memory outputs the reference image data in a read unit of a plurality of pixels which are continuous in a horizontal direction or a vertical direction, and wherein the area is an area that is a plurality of the read units in the horizontal direction and the vertical direction, respectively.

Further, the present invention is applied to a recording medium that records a program for an image data processing method in which a cache memory is used, a predicted value is generated according to reference image data that is held in a reference image memory, and moving image data is coded and/or decoded with the aid of the predicted value, the image data processing method including: a reference image data request step of specifying an area of the reference image data on a screen by one-dimensional address data of the reference image memory, and requesting the reference image data that is used for generation of the predicted value from the cache memory; a cache memory retrieval step of retrieving reference image data corresponding to the request from the reference image data that is stored in the cache memory; a first reference image data output step of outputting the reference image data that is stored in the cache memory in response to the request when the corresponding reference image data is stored in the cache memory; and a second reference image data output step of storing the corresponding reference image data that is stored in the reference image memory in the cache memory, and also outputting the corresponding reference image data in response to the request when the corresponding reference image data is not stored in the cache memory, wherein the reference image memory outputs the reference image data in a read unit of a plurality of pixels which are continuous in a horizontal direction or a vertical direction, and wherein the area is an area that is a plurality of the read units in the horizontal direction and the vertical direction, respectively.

Still further, the present invention is applied to an image data processing device that uses a cache memory, generates a predicted value according to reference image data that is held in a reference image memory, and codes and/or decodes moving image data with the aid of the predicted value, including: a reference image data request section that specifies an area of the reference image data on a screen by one-dimensional address data of the reference image memory, and requests the reference image data that is used for generation of the predicted value from the cache memory; a cache memory retrieval section that retrieves reference image data corresponding to the request from the reference image data that is stored in the cache memory; a first reference image data output section that outputs the reference image data that is stored in the cache memory in response to the request when the corresponding reference image data is stored in the cache memory; and a second reference image data output section that stores the corresponding reference image data that is stored in the reference image memory in the cache memory, and also outputs the corresponding reference image data in response to the request when the corresponding reference image data is not stored in the cache memory, wherein the reference image memory outputs the reference image data in a read unit of a plurality of pixels which are continuous in a horizontal direction or a vertical direction, and wherein the area is an area that is a plurality of the read units in the horizontal direction and the vertical direction, respectively.

According to the configuration of the present invention, the configuration of the requested area is variously schemed, and can be set so that the cache memory is reduced in capacity, and the occurrence frequencies of a caching error is reduced. Accordingly, access frequencies of a memory bus can be reduced while the cache memory is reduced in capacity.

According to the present invention, access frequencies of a memory bus can be reduced while the cache memory is reduced in capacity.

BRIEF DESCRIPTION OF DRAWINGS

FIGS. 22(A) and 22(B) are plan views showing macroblocks of MPEG2.

FIGS. 23(A) to 23(G) are plan views showing macroblocks of MPEG4/AVC.

FIGS. 24(A), 24(B), and 24 are outlined line diagrams for explaining area changeover in a decoding device according to an embodiment 6 of the present invention.

FIG. 25 is a flowchart showing a treatment procedure of a decoding section core in a decoding device according to the embodiment 6 of the present invention.

BEST MODE FOR CARRYING OUT THE INVENTION

Hereinafter, a description will be given in detail of embodiments of the present invention appropriately with reference to drawings.

(1) Configuration of Embodiment 1

Figure 2:
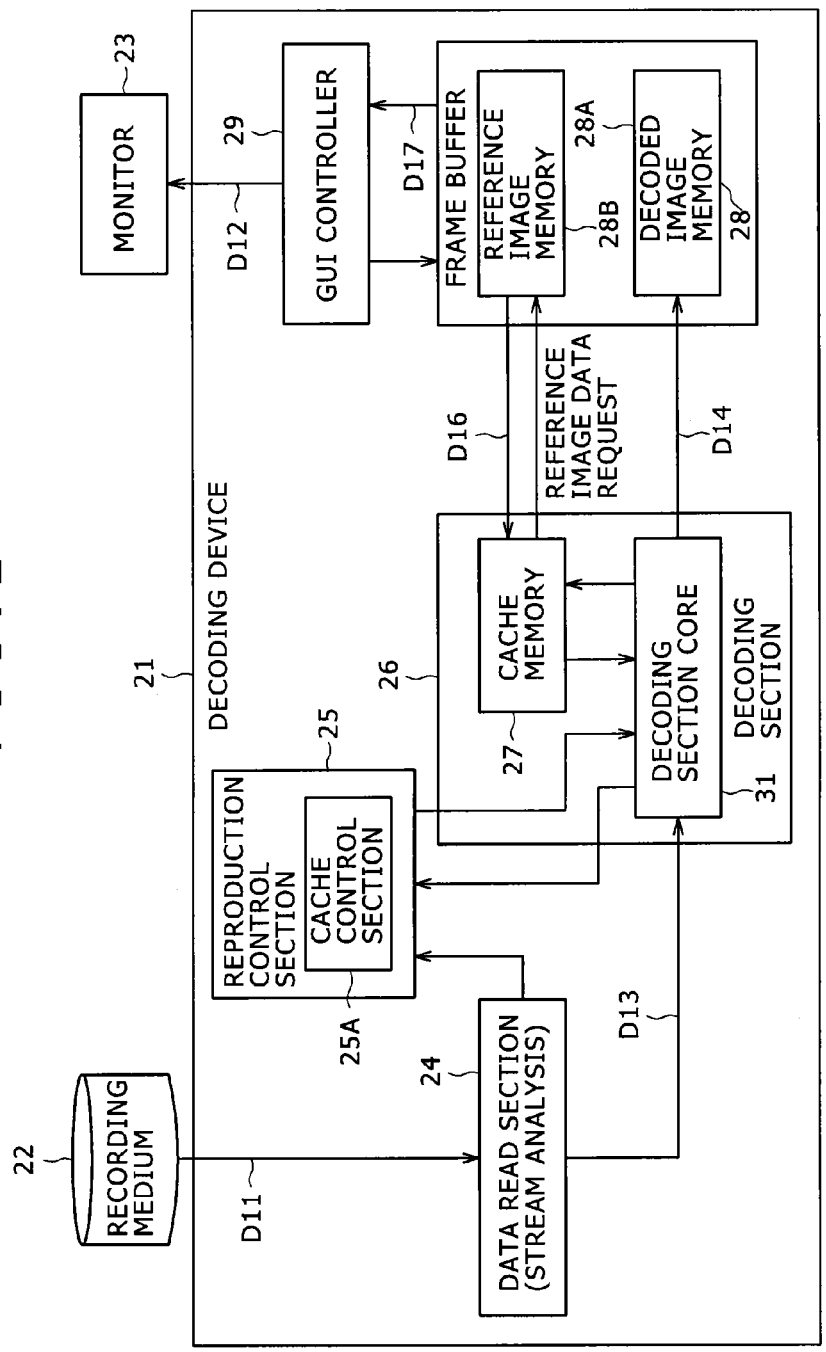
FIG. 2 is a block diagram showing a decoding device according to an embodiment 1 of the present invention.

FIG. 2 is a block diagram showing a decoding device according to an embodiment 1 of the present invention. This decoding device 21 is a decoding device of an MPEG-4AVC/ITU-T H. 264 system, which reproduces an input bit stream D11 from a recording medium 22, and decodes moving image data D12 to output the data to a monitor device 23. In this case, the recording medium 22 is, for example, a hard disk device, a DVD (digital versatile disk), or the like.

In the decoding device 21, a data read section 24 reproduces the input bit stream D11 from the recording medium 22. Also, the data read section 24 analyzes a packer header of the reproduced input bit stream D11, detects information necessary for decoding control of a picture type or the like to output the information to a reproduction control section 25, and also outputs a bit stream D13 to a decoding section 26.

The reproduction control section 25 controls operation of respective sections in the decoding device 21 on the basis of information on the picture type or the like, notice of which is given from the data read section 24. Also, a cache control section 25A sets an area of reference image data which is stored in a cache memory 27.

The decoding section 26 sequentially processes the bit stream D13 that is output from the data read section 24 to decode moving image data D14 with the aid of reference image data D16 which is held in a reference image memory 28B. In the process, the decoding section 26 processes the reference image data D16 that is held in the reference image memory 28B with the aid of the cache memory 27.

A frame buffer 28 is formed of, for example, a DRAM, and temporarily stores and holds the moving image data D14 that has been decoded by the decoding section 26 in a decoded image memory 28A under the control of a GUI controller 29, and outputs the held moving image data to the monitor device 23 in order to be displayed. Also, the frame buffer 28 temporarily stores and holds the moving image data D14 that is output from the decoding section 26 in the reference image memory 28B as the reference image data D16, and outputs the held reference image data D16 to the decoding section 26 under the control of the decoding section 26.

The GUI controller 29 executes the timing adjustment or the like of read of the moving image data D14 which is held in the decoded image memory 28A.

Figure 3:
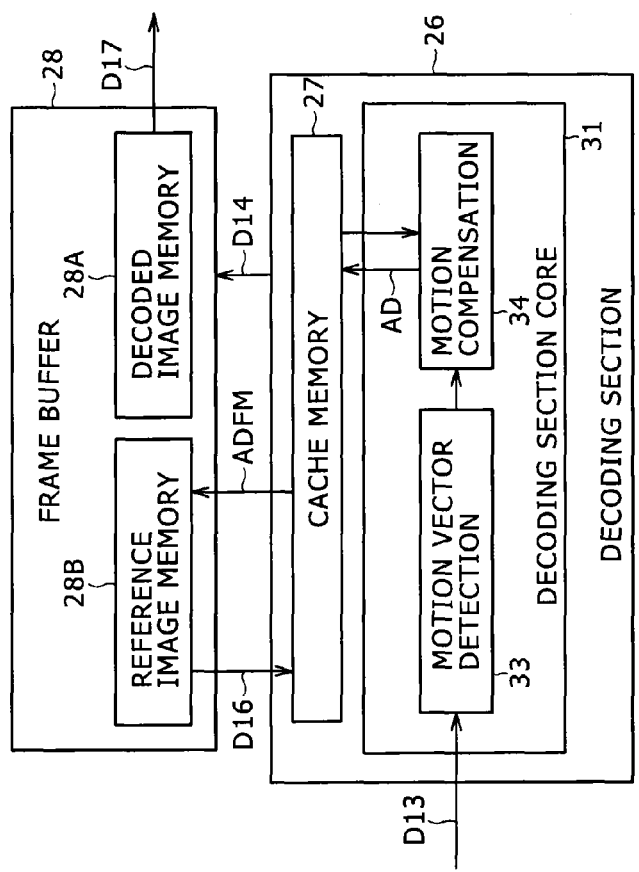
FIG. 3 is a block diagram showing a decoding section of the decoding device in FIG. 2 in detail.

FIG. 3 is a block diagram showing the decoding section 26 together with an associated configuration in detail. The decoding section 26 includes various function blocks having a decoding section core 31 of an arithmetic operating circuit, and executes a given processing program in the decoding section core 31 to decode the moving image data D14 from the bit stream D13. In this embodiment, the processing program is installed in the decoding device 21 in advance for provision. Instead of the installation in advance, the processing program can be recorded in various recording media such as an optical disc, a magnetic disk, and a memory card for provision, or can be downloaded over a network such as the internet for provision.

That is, the decoding section core 31 detects a motion vector from the bit stream D13 that is output from the data read section 24 by means of a motion vector detection section 33. Also, the decoding section core 31 sequentially subjects the bit stream D13 to a variable length decoding process, an inverse quantization process, and an inverse discrete cosine transform process by means of a variable length decoding section, an inverse quantization section, and an inverse discrete cosine transform section which are not shown to decode a predicted error value.

Also, in the case of decoding the image data that has been subjected to an inter-frame coding process, the decoding section core 31 obtains a position of the reference image data D16 that is used in the generation of the predicted value on the basis of the motion vector that has been detected by the motion vector detection section 33, and requests the output of the reference image data D16 at the obtained position from the cache memory 27 in a motion compensation section 34. In this case, when the requested reference image data D16 is held in the cache memory 27, the decoding section core 31 outputs the requested reference image data D16 to the motion compensation section 34 from the cache memory 27. On the contrary, when the requested reference image data D16 is not held in the cache memory 27, the decoding section core 31 acquires the requested reference image data D16 from the reference image memory 28B to output the data to the motion compensation section 34, and also holds the acquired reference image data D16 in the cache memory 27. The decoding section core 31 generates a predicted value used for decoding the image data with the aid of the reference image data D16. Also, the decoding section core 31 adds the predicted value to a predicted error value, and decodes the moving image data. Also, the decoding section core 31 processes the decoded moving image data through a deblocking filter to output the data to the frame buffer 28.

On the contrary, in the case of decoding the image data that has been subjected to the in-frame coding process, a predicted value is generated according to the moving image data D14 that is output to the frame buffer 28, and the predicted value is added to the predicted error value to decode the moving image data D14.

Figure 4:
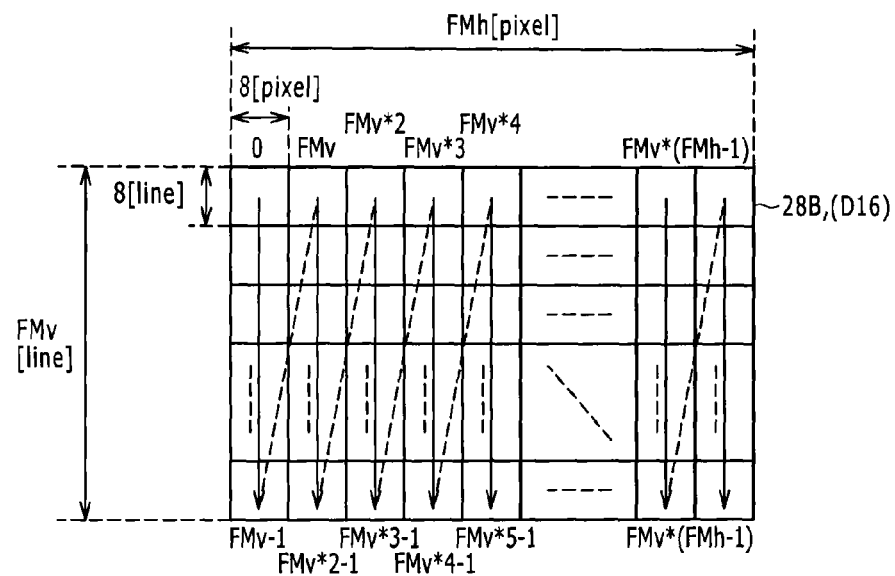
FIG. 4 is an outlined line diagram showing a configuration of a reference image memory in the decoding device in FIG. 2.

Now, FIG. 4 is a diagram showing an address map of the reference image memory 28B for comparison with the reference image data D16 for one frame. In the MPEG-4AVC/ITU-T H. 264 system, since the most suitable reference frame is selected from a plurality of reference frames to generate a predicted value, the reference image memory 28B is so formed that the plurality of reference frames can be held in the decoding device 21. Accordingly, in the reference image memory 28B, an address is so assigned that the plurality of reference frames can be held, and the cache memory 27 selectively stores the reference image data D16 for the plurality of frames. However, in the following description, for simplification of description, a description will be given assuming that the reference image memory 28B stores the reference image data D16 for one frame.

In the decoding device 21, the reference image memory 28B is produced with a bus width of 64 bits (8 bytes=8 pixels). Accordingly, the reference image memory 28B is so formed as to output the reference image data for 8 pixels in a lump by one access to the reference image memory 28B. Also, the reference image memory 28B is set to 8 pixels that are output in a lump and continuous in a horizontal direction, and is so formed that the reference image data D16 in an area of 8 pixels×1 pixel is output by one access. Accordingly, the reference image memory 28B has the read unit of the reference image data set to 8 pixels that are continuous in the horizontal direction.

In this example, in the MPEG-4AVC/ITU-T H. 264 system, there are provided plural kinds of generation units of the predicted value in the inter-frame coding process, and the predicted value is generated with the aid of the optimum generation unit. Note that the generation units of plural kinds are 16 pixels×16 pixels, 16 pixels×8 pixels, 8 pixels×16 pixels, 8 pixels×8 pixels, 8 pixels×4 pixels, 4 pixels×8 pixels, and 4 pixels×4 pixels in the sizes in the horizontal direction and the vertical direction, respectively, which are so-called macroblock and sub-macroblock. The 8 pixels continuous in the horizontal direction which are output by the reference image memory 28B in a lump by one access are the number of pixels that is smaller than the number of pixels in the horizontal direction of the generation units (16 pixels×16 pixels, 16 pixels×8 pixels) largest in the horizontal direction among the generation units of the plural kinds of predicted values, and half of the number of pixels of those generation units in the horizontal direction.

The reference image memory 28B has one address assigned to an area of 8 pixels×1 pixel which can be output in a lump by one time. Also, one-dimensional addresses from 0 to FMv×(FMh−1) are sequentially assigned to horizontal size FMh×vertical size FMv of the reference image data D16 having the above area as a unit, in the order of sequentially repeating vertical scanning from a raster scanning start side, as indicated by arrows in FIG. 4. Accordingly, given higher bits among the addresses of FMv×(FMh−1) are indicative of the order of vertically long areas obtained by sectioning one screen of the reference image data D16 by 8 pixel units in the horizontal direction from a raster scanning start end side. Also, lower bits in the address of FMv×(FMh−1) are indicative of the order from the raster scanning start end side in the vertically long areas.

Figure 5:
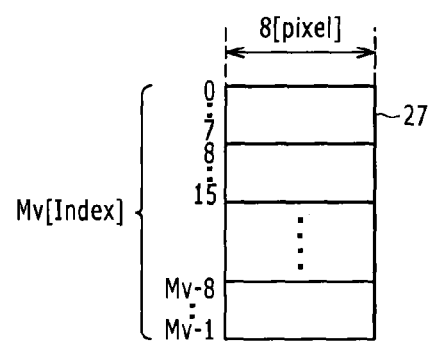
FIG. 5 is an outlined line diagram for explaining a cache memory in the decoding device in FIG. 2.

Also, FIG. 5 is a diagram showing the configuration of the cache memory 27. The cache memory 27 is a memory that is assigned with the one-dimensional address as in the reference image memory 28B. The cache memory 27 is set with the horizontal size in 8 pixels which can be output from the reference image memory 28B at one time, and the number of indexes is set to a given number Mv. Accordingly, the cache memory 27 is so configured as to output the reference image data D16 of 8 pixels which are continuous in the horizontal direction in a lump at one time.

Figure 6:
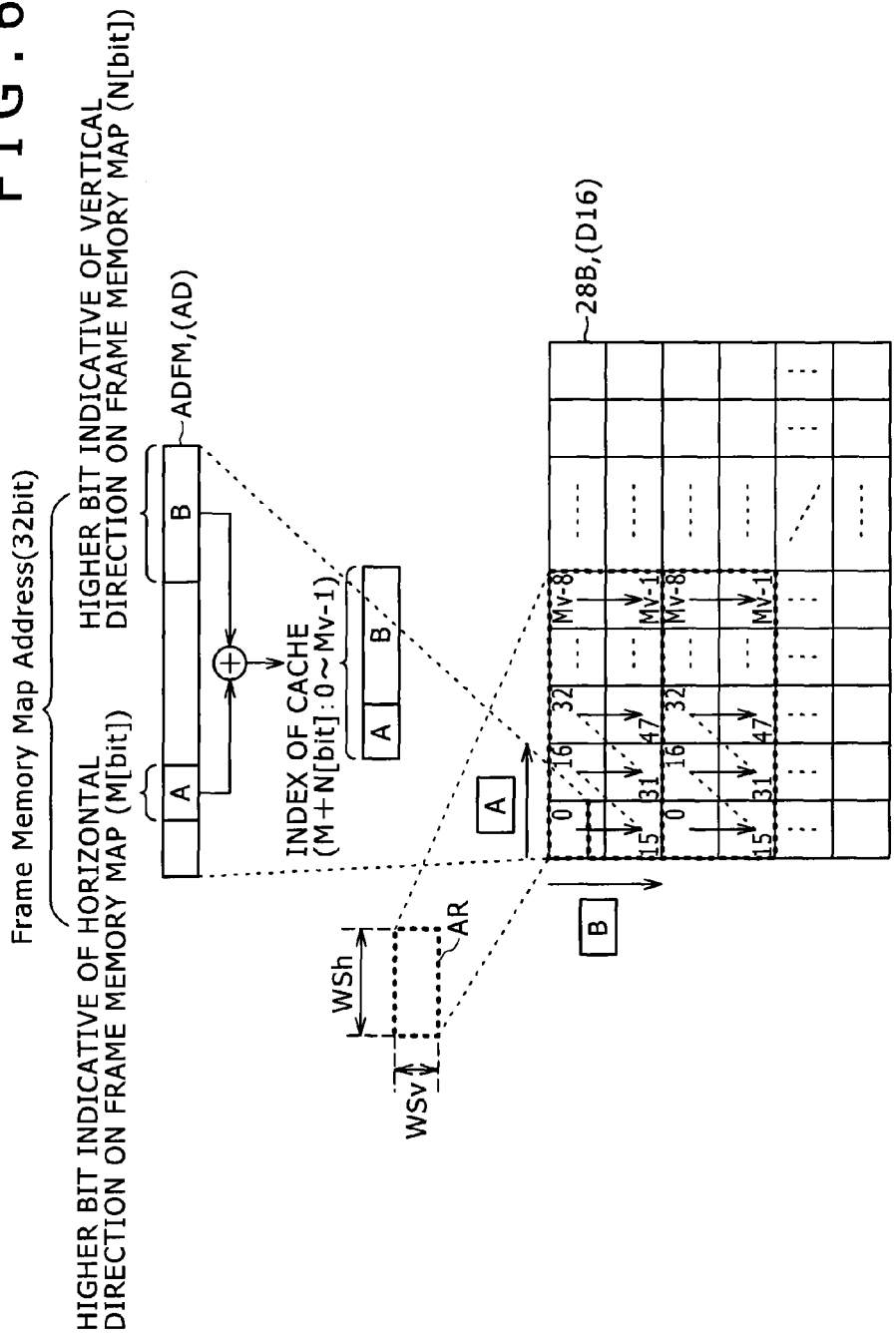
FIG. 6 is an outlined line diagram for explaining an index of the cache memory in the decoding device in FIG. 2.

In this case, as shown in FIG. 6, in the cache memory 27, the reference image data of a given area AR which is clipped from one screen of the reference image data D16 is input from the reference image memory 28B and held therein. In this example, this area AR is a rectangular area, and a size WSh in the horizontal direction is set to the size twice or more as large as 8 pixels that can be loaded from the reference image memory 28B at one time. Also, a size WSv in the vertical direction is set to a given line number, and in an example in FIG. 6, the number of lines is set to 16 lines. Accordingly, in this embodiment, as for the read unit of the reference image data from the reference image memory 28B, the clipped area AR is set to a plurality of read units in the horizontal direction and the vertical direction, respectively. The sizes WSh and WSv of the clipped area AR in the vertical direction and the lateral direction are set to be equal or larger than the maximum sizes among the predicted value generation unit in this embodiment. An index number Mv of the cache memory 27 is set to a multiplied value of WSh×WSv which are sizes in the lateral direction and the vertical direction of the given area AR.

The decoding section core 31 determines a position of the area AR on the basis of a position of the reference image data D16 used for generation of the predicted value which has been calculated by the motion compensation section 34. Also, the decoding section core 31 requests the output of the reference image data D16 in the area AR from the cache memory 27. In this time, in the order indicated by arrows in FIG. 6, the decoding section core 31 issues address data AD to the cache memory 27, and requests the output of the reference image data D16 from the cache memory 27. Also, in the case where the requested reference image data D16 is not stored in the cache memory 27, the decoding section core 31 acquires the corresponding reference image data D16 from the reference image memory 28B to generate the predicted value, and stores the acquired reference image data D16 in the cache memory 27.

In this time, the decoding section core 31 clips, from an address data ADFM issued to the reference image memory 28B, given bits A of the higher side indicative of the order of vertically long areas obtained by sectioning one screen of the reference image data D16 in the unit of 8 pixels in the horizontal direction from the raster scanning start end side, and given bits B of the lower side indicative of the order from the raster scanning start end side in the respective vertically long areas to couple those bits together, and generates two-dimensional addresses indicative of the position of the reference image data D16 on the screen in the respective reference image data of 8 pixels which are continuous in the horizontal direction. The decoding section core 31 sets the two-dimensional addresses to index of the respective reference image data that is held in the cache memory 27.

In the case of producing the index of the respective reference image data that is held in the cache memory 27 with the higher bits A and the lower bits B of the address data ADFM issued to the reference image memory 28B, the variability of the clipped area AR can be flexibly coped with by the variability of bit numbers M and N of the higher bits A and the lower bits B. Specifically, as compared with an example shown in FIG. 6, in the case of clipping the reference image data in the vertically long area, the number of bits M of the higher bits A increases and the number of bits N of the lower bits B decreases correspondingly, thereby coping with the above case.

Figure 7:
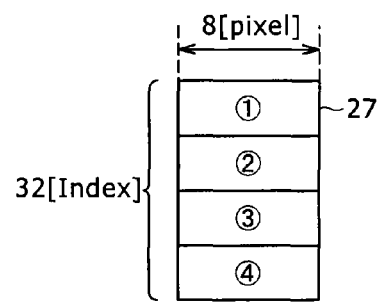
FIG. 7 is an outlined line diagram showing a configuration of the cache memory in the decoding device in FIG. 2.
Figure 8:
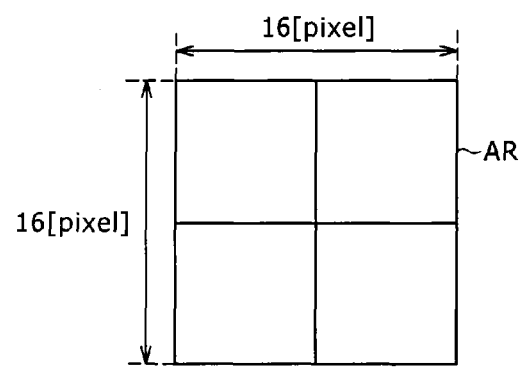
FIG. 8 is an outlined line diagram showing an area that is stored in the cache memory in FIG. 7.

More specifically, in this embodiment, the cache memory 27 is configured by one way of 256 bytes as shown in FIG. 7. In this example, 256 bytes is a size corresponding to the reference image data amount of the largest predicted value generation unit. Also, as shown in FIG. 8, the size of the clipped area AR is set to the size of the largest predicted value generation unit by means of the cache control section 25A. Accordingly, the clipped area AR has the horizontal size WSh set to 16 pixels and the vertical size WSv set to 16 pixels.

Figure 9:
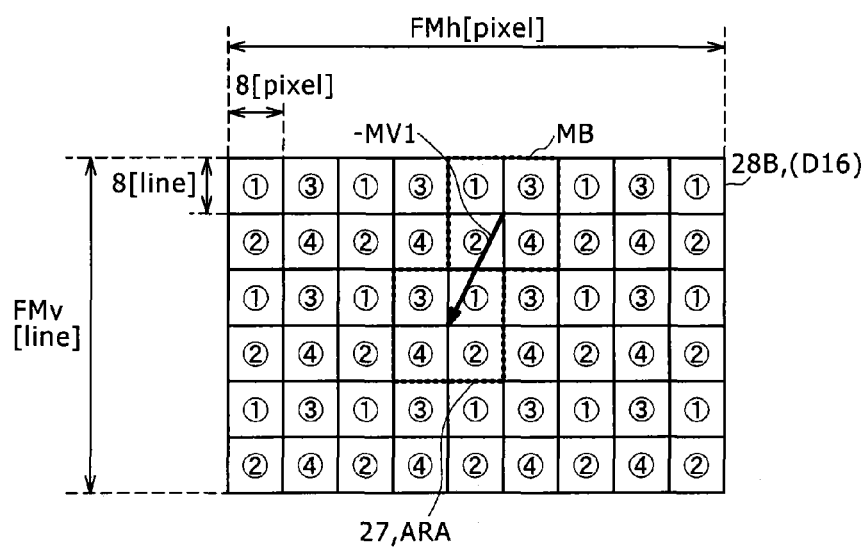
FIG. 9 is an outlined line diagram for explaining access to the cache memory in the decoding device in FIG. 2.

As shown in FIG. 9, when a motion vector MV1 is detected in a given macroblock MB, the decoding section core 31 obtains an area ARA resulting from displacing the area of the macroblock MB in a direction opposite to the motion vector MV1 by the size of the motion vector MV1 by means of the motion compensation section 34 through calculation. Also, the decoding section core 31 sequentially issues the address data AD of the area ARA to the cache memory 27, and requests the output of the reference image data D16 in the area ARA from the cache memory 27. FIG. 9 shows a case in which the predicted value is generated in the macroblock MB of 16 pixels×16 pixels.

In the same manner described above with reference to FIG. 6, the decoding section core 31 produces two-dimensional address data from the higher bits A and the lower bits B of the address data AD, sequentially retrieves the index that is set in the cache memory 27 with the aid of the produced two-dimensional address data, and determines whether the requested reference image data has been held in the cache memory 27, or not.

Here, as shown in FIG. 9, in the case where the requested reference image data is held in the cache memory 27, the decoding section core 31 acquires the reference image data to generate a predicted value. On the contrary, in the case where the requested reference image data is not held in the cache memory 27, the decoding section core 31 issues the address data ADFM of the reference image data D16 not held, requests the output of the corresponding reference image data D16 from the reference image memory 28B, and obtains the reference image data from the reference image memory 28B to generate a predicted value. Also, the decoding section core 31 updates the reference image data that is held in the cache memory 27 with the aid of the acquired reference image data, and also updates the index so as to correspond to the updated reference image data. In this case, in FIG. 9, the use of circled numbers is indicative of the index in the cache memory 27, of the respective blocks of 8 pixels×8 pixels in the reference image data D16, and also indicative of a storage location of the cache memory 27, by comparison with FIG. 7.

Figure 10:
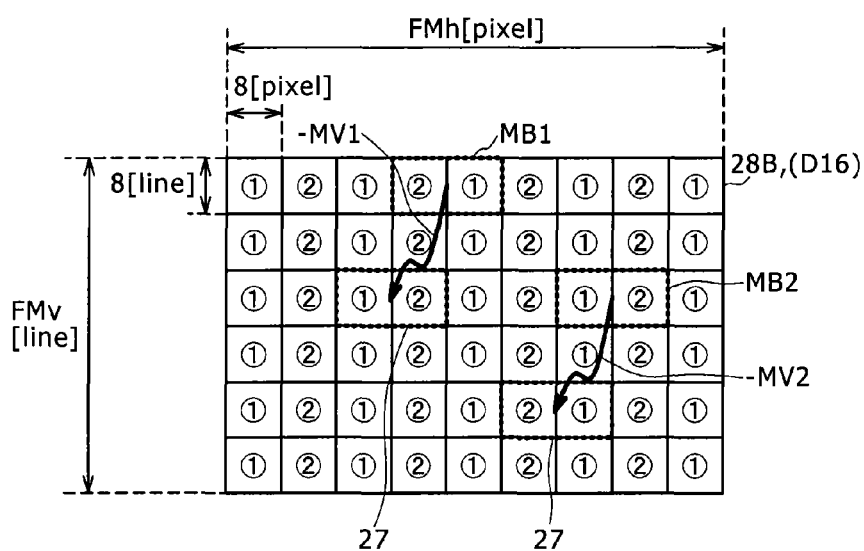
FIG. 10 is an outlined line diagram for explaining access to the cache memory in an example different from that in FIG. 9.

In the case where the macroblocks MB1 and MB2 of 16 pixels×8 pixels, and 8 pixels×16 pixels are sequentially processed, for example, as shown in FIG. 10, the cache memory 27 stores the reference image data to which the two continuous macroblocks MB1 and MB2 refer therein. Also, in the case of processing the macroblock or the sub macroblock which is smaller in the size such as 8 pixels×8 pixels, likewise, the cache memory 27 stores the reference image data to which the respective macroblocks and the sub macroblocks refer therein.

(2) Operation of Embodiment 1

In the above configuration, the input bit stream D11 (FIG. 2) that is reproduced from the recording medium 22 is decoded to the moving image data D14 by the decoding section 26, and the moving image data D14 is output to the monitor device 23 through the decoded image memory 28A and the GUI controller 29. Also, the decoded moving image data D14 is stored in the reference image memory 28B as the reference image data D16, and used for generation of the predicted value when the decoding section 26 decodes the moving image data D14.

More specifically (FIG. 3), in the input bit stream D11, the motion vector is detected in the motion vector detection section 33 configured by the decoding section core 31 of the decoding section 26. Also, the address data AD of the reference image data D16 used for generation of the predicted value is obtained by the motion compensation section 34 on the basis of the detected motion vector, and the reference image data D16 is obtained by the address data AD. In this time, in the case where the reference image data D16 corresponding to the cache memory 27 is held, the reference image data used for generation of the predicted value is obtained from the cache memory 27 in the decoding device 21. On the contrary, in the case where the reference image data D16 corresponding to the cache memory 27 is not held, the corresponding reference image data D16 is acquired from the reference image memory 28B in the decoding device 21, and the corresponding reference image data D16 is stored and held in the cache memory 27.

Accordingly, in the case where the predicted value is generated in the continuous predicted value generation unit with the aid of the continuous and same reference image data, the reference image data that is held in the cache memory 27 is repetitively used to enable the generation of the predicted value, and the moving image data D14 can be decoded at a high speed as compared with a case in which no cache memory is used.

However, since the cache memory 27 is managed by the one-dimensional address having a plurality of pixels that can be read at one time as a unit, a cache error increases when the conventional manner is merely applied. Accordingly, it is necessary to frequently access to the reference image memory 28B, and the access frequencies of the memory bus are increased.

Figure 11:
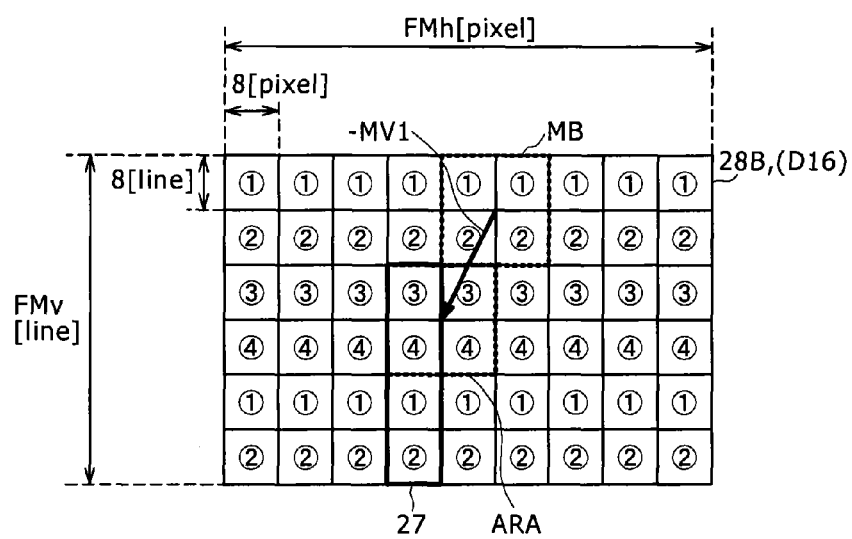
FIG. 11 is an outlined line diagram for explaining access to the cache memory in a related decoding device.

That is, FIG. 11 is an outlined line diagram showing a case in which the reference image data is stored in the cache memory 27 through the conventional manner as compared with FIGS. 7 and 9. In the case of managing the reference image data that is held by the one-dimensional address, as to the reference image data that is stored in the cache memory, only the image data that is one-dimensionally continuous on the screen of the reference image data D16 can be stored, as a result of which in the case of using the cache memory having the size of this embodiment, as shown in FIG. 11, the reference image data can be stored in only the vertically long area of 8 pixels in the lateral direction×32 lines in the vertical direction.

Therefore, in this event, in the case of producing the predicted value in the macroblock of 16 pixels×16 pixels which is the maximum size, even if the reference image data of the area ARA of 16 pixels×16 pixels corresponding to the macroblock is read from the cache memory, the cache error resultantly occurs. That is, in an example in FIG. 11, it is necessary to afresh read the reference image data of the right half of the area ARA from the reference image memory. Accordingly, the access frequencies of the memory bus are increased.

As one method for solving the above problem, there is proposed a method in which the size of the cache memory in the lateral direction is enlarged to increase the number of pixels that can be read at the same time, and the cache memory that can access to the area of 16 pixels×16 pixels is configured even by the one-dimensional address management. However, in the case, the capacity of the cache memory gets large, and the configuration of the memory bus becomes complicated. Also, there is proposed a method in which the cache memory is configured by two ways. However, also in this case, the capacity of the cache memory gets large, and the configuration of the memory bus becomes complicated.

Accordingly, in the case of the conventional manner, it is difficult to reduce the access frequencies of the memory bus while the cache memory is reduced in capacity.

Therefore, in this embodiment (FIGS. 4 to 6), the reference image data is stored and held in the cache memory 27 by the plurality of areas of the read unit in the horizontal direction and the vertical direction, respectively, with 8 pixels consisting of the plurality of pixels continuous in the horizontal direction which is the read unit of the reference image data from the reference image memory 28B as a unit. Also, the reference image data is requested according to the one-dimensional address data that specifies the above areas.

As a result, the setting of the configuration of that area enables the cache error to be reduced while the cache memory is reduced in capacity, as compared with a case in which the reference image data is held in the cache memory by the areas continuous in the vertical direction of the mere read unit as in the related art.

More specifically, in this embodiment (FIGS. 4 to 6), the given bits A of the higher side indicative of the position of the reference image data D16 on the screen in the horizontal direction, and the given bits B of the lower side indicative of the position in the vertical direction are clipped from the one-dimensional address data that requests the reference image data D16, and coupled together, to generate the two-dimensional address indicative of a position of the reference image data D16 on the screen. In the decoding device 21, the two-dimensional address is set to the index of the cache memory 27.

When the two-dimensional address indicative of the position of the reference image data D16 on the screen is set to the index of the cache memory 27, the reference image data D16 that has been stored in the cache memory 27 can be managed by the two-dimensional address with a plurality of pixels that can be read at one time as a unit. Accordingly, an area having a desired size in the horizontal direction and the vertical direction is set with the plurality of pixels that can be read at one time as the unit, the reference image data in this area can be stored in the cache memory 27 and also loaded from the cache memory 27. Accordingly, even if the size of the cache memory 27 does not increase, the reference image data D16 in the area corresponding to the generation unit of the predicted value can be stored in the cache memory 27, and as compared with the related art, the frequencies of the cache error can be reduced, and the access frequencies of the memory bus can be reduced.

Therefore, in this embodiment, likewise, the two-dimensional address is generated in the address data that requests the reference image data D16, the reference image data D16 that has been held in the cache memory 27 is output to the decoding section core 31 due to a comparison of the two-dimensional address with the index of the cache memory 27, and also when the corresponding reference image data D16 is not held in the cache memory 27, the corresponding reference image data D16 is output to the decoding section core 31 from the reference image memory 28B. In this case, the reference image data D16 read from the reference image memory 28B is stored in the cache memory 27, and the index is updated so as to correspond to the storage of the reference image data D16.

(3) Advantages of Embodiment 1

According to the above configuration, the address data is so issued as to specify the areas that are a plurality of read units in the horizontal direction and the vertical direction, respectively, and the reference image data is stored in the cache memory, thereby enabling the access frequencies of the memory bus to be reduced while the cache memory is reduced in capacity.

More specifically, the two-dimensional address indicative of the position of the reference image data on the screen is generated with the plurality of pixels that can be read at one time as the unit, and the two-dimensional address is set to the index of the cache memory, thereby enabling the access frequencies of the memory bus to be reduced while the cache memory is reduced in capacity.

Also, the two-dimensional address is produced by coupling the given bits of the higher side indicative of the position of the reference image data en one screen in the horizontal direction, and the given bits of the lower side indicative of the position in the vertical direction together from the address data that accesses to the cache memory, thereby enabling the two-dimensional address to be produced with simple processing.

(4) Embodiment 2

Figure 12:
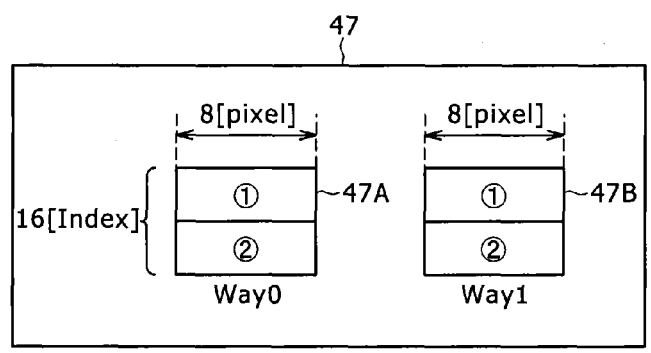
FIG. 12 is an outlined line diagram showing a configuration of a cache memory in a decoding device according to an embodiment 2 of the present invention.

FIG. 12 is an outlined line diagram showing a configuration of a cache memory 47 that is applied to a decoding device according to an embodiment 2 of the present invention, by comparison with FIG. 7. In the decoding device of this embodiment, the cache memory 47 is configured by two ways. The decoding device according to this embodiment is identical in the configuration with the decoding device 21 of the embodiment 1 except that a configuration of the cache memory 47 is different, and in the following description, the drawings of the embodiment 1 are appropriately diverted.

In the decoding device according to this embodiment, a memory bus width is set to 64 bits, and the cache memory 47 has 2-way configuration each being 128 bytes. Accordingly, the area of 8-pixels×8-pixels can hold the respective ways 47A and 47B two by two.

Figure 13:
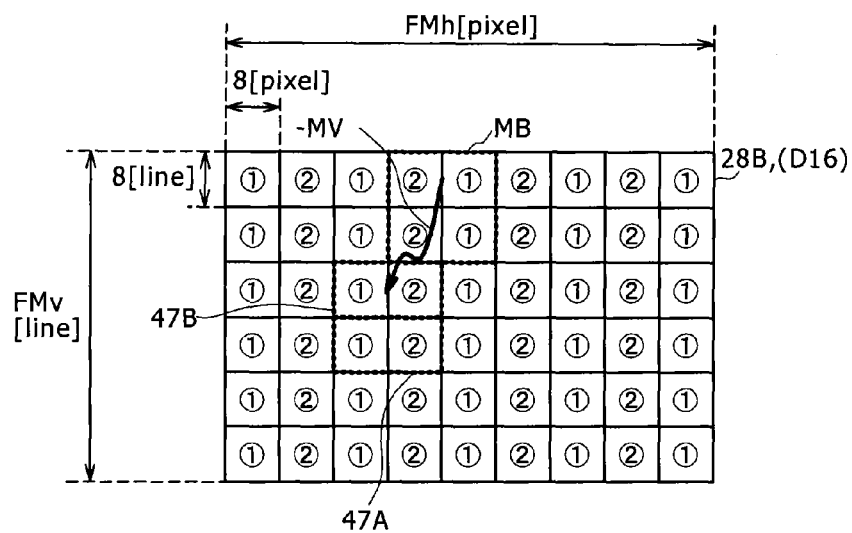
FIG. 13 is an outlined line diagram for explaining access to the cache memory in the decoding device according to the embodiment 2 of the present invention.

In the decoding device, in the case where a decoding section core 31 generates a predicted value of a macroblock MB of 16 pixels×16 pixels, as shown in FIG. 13, a reference image data to which the macroblock MB refers is stored in the two ways 47A and 47B. Accordingly, in this case, in the same manner as that described above in the embodiment 1, access frequencies of the memory bus can be reduced while the cache memory is reduced in capacity.

Figure 14:
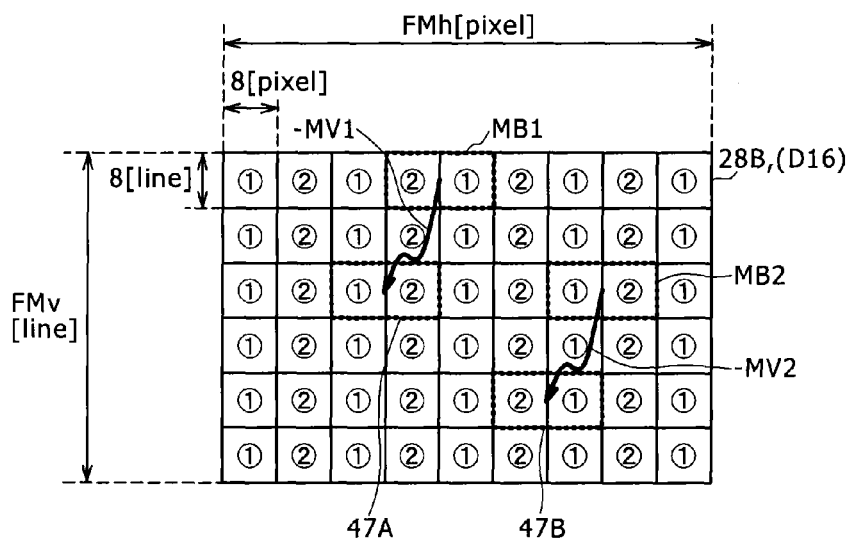
FIG. 14 is an outlined line diagram for explaining access to the cache memory in the related decoding device.

On the contrary, in the case of continuously processing macroblocks MB1 and MB2 of 16 pixels×8 pixels, and 8 pixels×16 pixels, as shown in FIG. 14, the reference image data to which the macroblocks MB1 and MB2 refer, respectively, is stored in the respective ways 47A and 47B.

Figure 15:
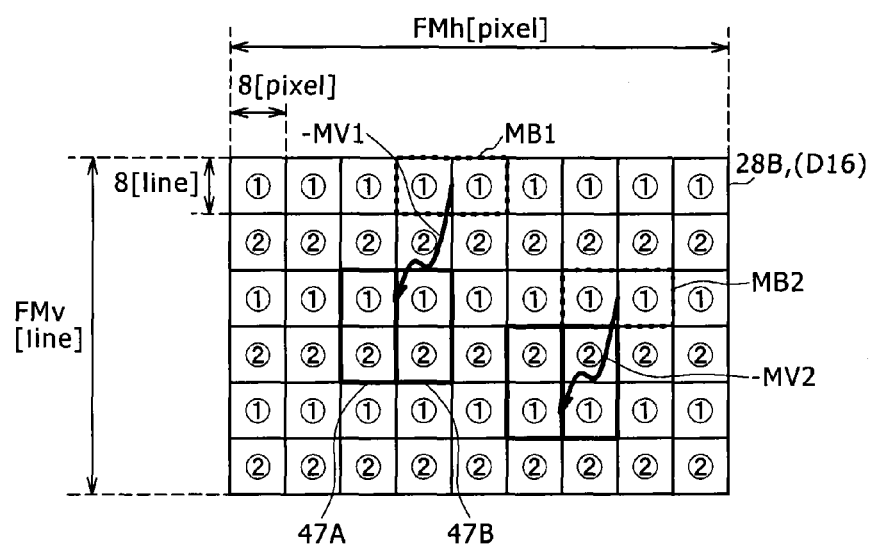
FIG. 15 is an outlined line diagram for explaining an access to the cache memory in an example different from that of FIG. 13.

On the contrary, as shown in FIG. 15, in the case of managing the reference image data that has stored in the cache memory 47 by mere one-dimensional address, the respective ways 47A and 47B can store a reference image data D16 in only a vertically long area in the same manner as that described above in FIG. 11, as a result of which, similarly in this case, a cache error occurs in a subsequent process of the predicted value generation unit having the same size, and it is necessary to refer to a reference image memory 28B.

However, in this embodiment, since the reference image data D16 of the area corresponding to the subsequent predicted value generation unit having the same size is stored in the respective ways 47A and 47B of the cache memory 47 as shown in FIG. 14 by comparison with FIG. 15, occurrence frequencies of the cache error can be reduced as compared with the related art.

According to this embodiment, even when the cache memory is configured by the two ways, the same advantages as these in the embodiment 1 can be obtained.

(5) Embodiment 3

In this embodiment, the present invention is applied to a coding device of moving image data using an MPEG-4AVC/ITU-T H. 264 system, and a cache memory is applied to processing of a reference image data used for generation of a predicted value. Accordingly, in a coding device according to this embodiment, in the configuration of FIG. 1, a cache memory is disposed between a reference image memory 11 and a motion compensation section 12. The coding device according to this embodiment is identical in the configuration with the coding device in FIG. 1 except that the configuration related to this cache memory is different, and in the following description, the configuration in FIG. 1 is appropriately diverted.

Figure 1:
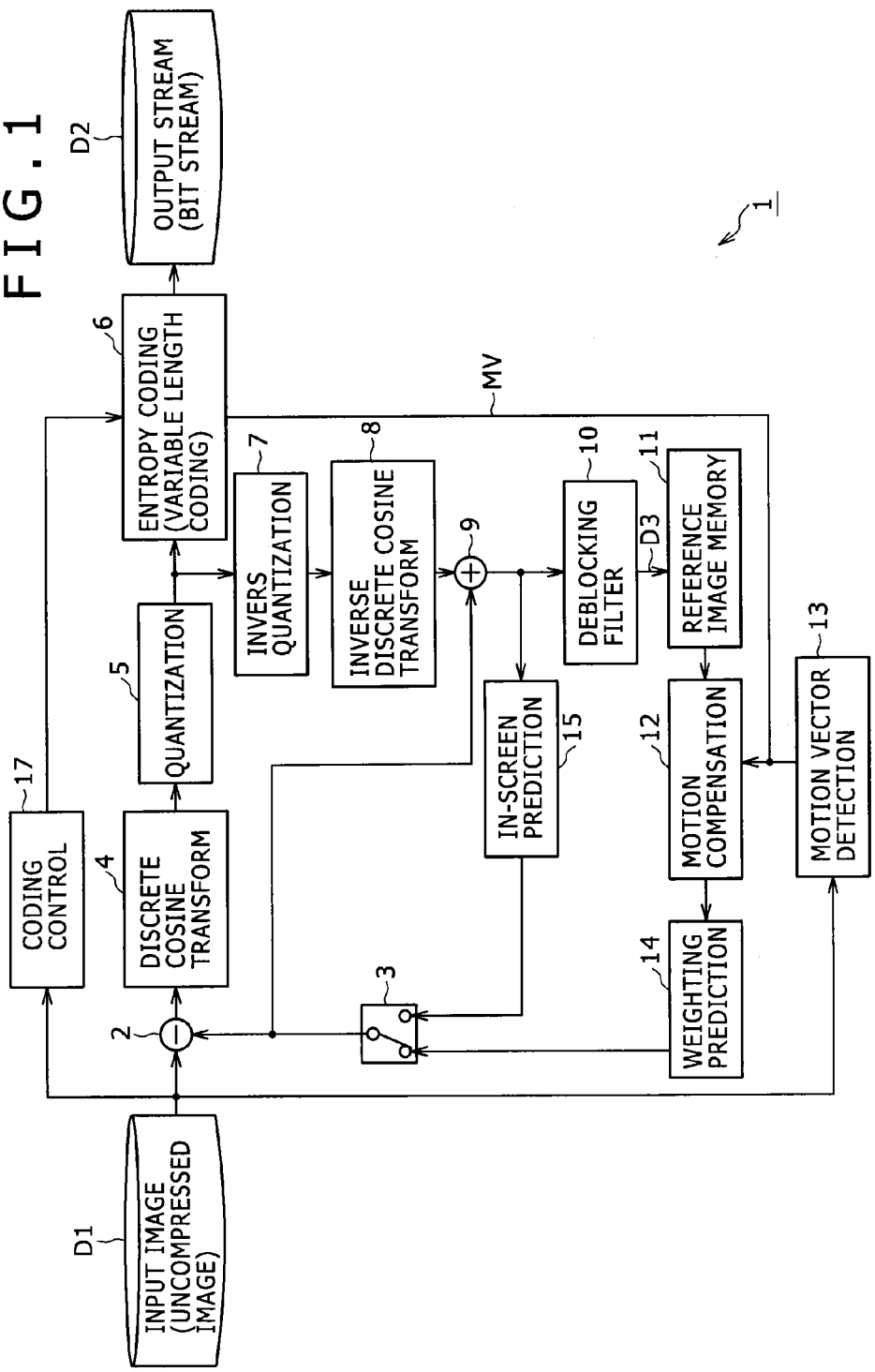
FIG. 1 is a block diagram showing a related coding device.

In the coding device according to this embodiment, respective function blocks shown in FIG. 1 are configured by a coding section core being an arithmetic processing circuit. Note that in this embodiment, a processing program of the coding section core is installed in the coding device in advance for provision, but instead of the installation in advance, the processing program can be recorded in various recording media such as an optical disc, a magnetic disk and a memory card for provision, or can be downloaded over a network such as the internet for provision.

Figure 16:
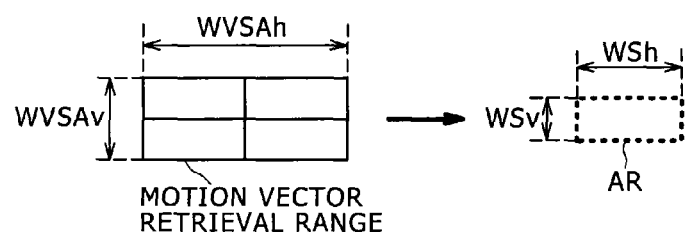
FIG. 16 is an outlined line diagram for explaining a cache memory in a coding device according to an embodiment 3 of the present invention.

In the coding device, the cache memory holds reference image data of a given area AR on a screen of reference image data D3. In this embodiment, as shown in FIG. 16, a ratio of a size WSh to a size WSv of the area AR in a vertical direction and a lateral direction is set to be equal to a ratio of a horizontal size MVSAh to a vertical size MVSAv of a motion vector retrieval range in a motion vector detection section 13. That is, in this case, setting is made to satisfy WSh:WSv=MVSAh:MVSAv. Similarly, in this embodiment, since the sizes WSh and WSv of the clipped area AR are set with the 8 pixels continuous in the horizontal direction as a unit, a case where it is difficult that those ratios perfectly coincide with each other is predicted, and in this case, the sizes WSh and WSv of the area AR in the vertical direction and the lateral direction are set so that the ratio of the size WSh to the size WSv approaches the ratio of the horizontal size MVSAh to the vertical size MVSAV as much as possible. It is needless to say that the sizes WSh and WSv of the clipped area AR in the vertical direction and the lateral direction are set to sizes including the maximum sizes of the predicted value generation unit.

In the case where the moving image data is coded in an inter-frame coding process, the coding section core obtains a position of the reference image data D3 used for generation of the predicted value by means of the motion compensation section 12 on the basis of the motion vector detected by the motion vector detection section 13. Also, the coding section core requests the output of the reference image data D3 at the obtained position from the cache memory. In this event, when the requested reference image data D3 is held in the cache memory, the coding section core outputs the requested reference image data D3 to the motion compensation section 12 from the cache memory. On the contrary, when the requested reference image data D3 is not held in the cache memory, the coding section core acquires the requested reference image data D3 from the reference image memory 11 to output the data to the motion compensation section 12.

When the reference image data D3 is acquired from the reference image memory 11, the coding section core acquires the reference image data D3 in the area AR from the reference image memory 11 to hold the data in the cache memory, and updates the index of the cache memory so as to correspond to the storage of this reference image data. Note that in this case, the area AR is set so that, for example, the position of the reference image data used for generation of the predicted value becomes a position of the center of the area AR. Note that in this case, the area AR may be set so that the position of the reference image data used for generation of the predicted value becomes a position where the center position of the area AR is displaced to the position of the subsequent predicted value generation unit.

According to this embodiment, the present invention is applied to the coding device, a two-dimensional address indicative of the position of the reference image data on the screen is generated with the plurality of pixels that can be read at one time as a unit, and the two-dimensional address is set to the index of the cache memory, thereby enabling access frequencies of the memory bus to be reduced while the cache memory is reduced in capacity.

(6) Embodiment 4

In this embodiment, the present invention is applied to a coding device of moving image data by an MPEG-4AVC/ITU-T H. 264 system as in the embodiment 3, to change over a configuration of an area that is stored in a cache memory. Note that the coding device according to this embodiment is identical in the configuration with the coding device in the embodiment 4 except that the configuration related to this cache memory is different.

Figure 17A:
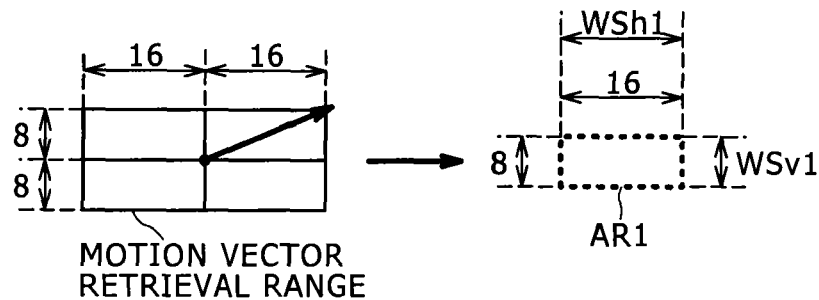
FIGS. 17(A) and 17(B) are outlined line diagrams for explaining a cache memory in a coding device according to an embodiment 4 of the present invention.
Figure 17B:
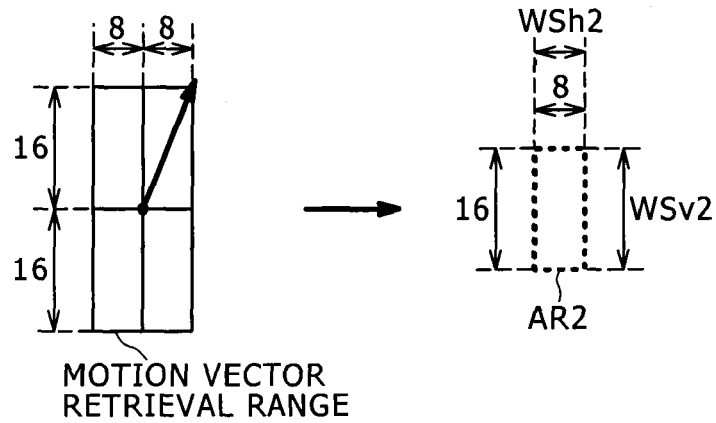

The coding device according to this embodiment includes, as areas of reference image data D3 that is stored in the cache memory, a first area AR1 that is 16 pixels×8 pixels in sizes corresponding to a motion retrieval range of 32 pixels×16 pixels shown in FIG. 17(A) in the horizontal direction and the vertical direction, and a second area AR2 that is 8 pixels×16 pixels in the sizes corresponding to the motion retrieval range of 16 pixels×32 pixels shown in FIG. 17(B) in the horizontal direction and the vertical direction.

Accordingly, in the case of detecting a motion vector in the motion retrieval range of 32 pixels×16 pixels, the reference image data is stored in the first area AR1 in the cache memory to enable a hit ratio to increase. On the contrary, when the motion vector is detected in the motion retrieval range of 16 pixels×32 pixels, the reference image data is stored in the second area AR2 in the cache memory to enable the hit ratio to increase.

Figure 18:
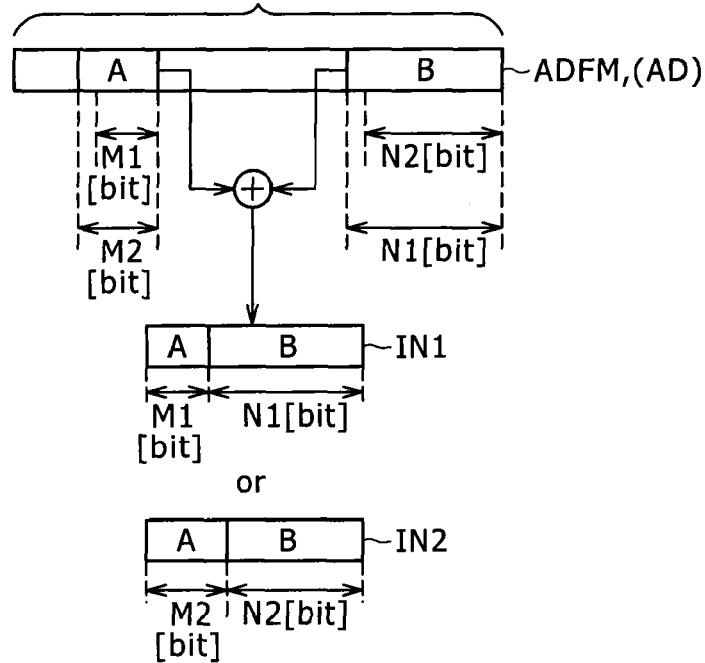
FIG. 18 is an outlined line diagram for explaining an index in the coding device of FIG. 17.

Also, by comparison with FIG. 6, as shown in FIG. 18, an index of the cache memory switches over in correspondence with the changeover of the first and second areas AR1 and AR2. That is, similarly, in this case, bits A indicative of a position in a lateral direction and bits B indicative of a position in a vertical direction are clipped from address data ADFM that accesses to a reference image memory 11, and combined together, to produce an index of the cache memory. In this case, when an index of the second area that is vertically long is produced as compared with the case of the first area AR1 that is laterally long, the number of bits M of the higher bits A is increased, and the number of bits N of the lower bits B is decreased correspondingly, thereby producing the index in correspondence with the changeover of the configurations of those two areas AR1 and AR2.

Figure 19:
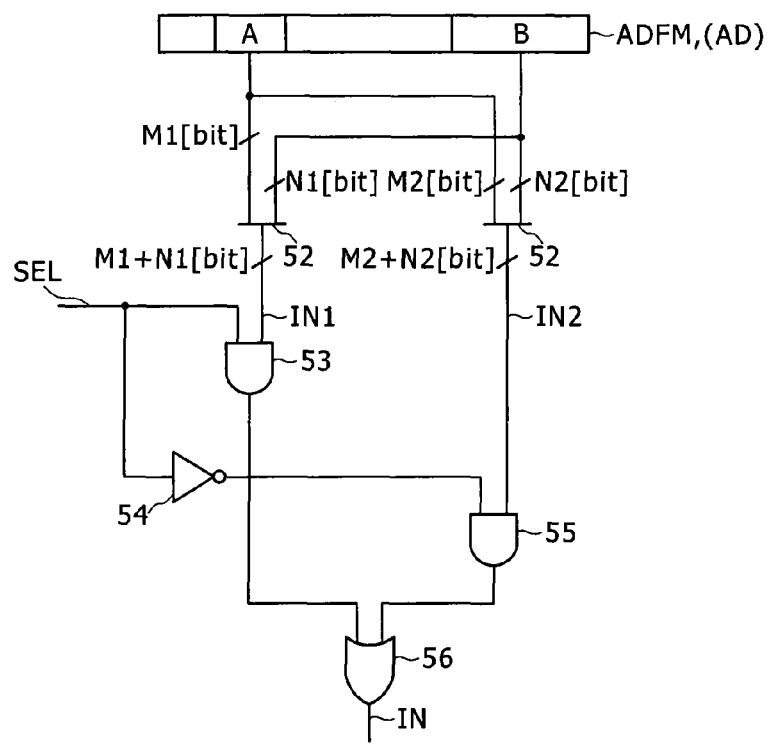
FIG. 19 is an outlined line diagram showing a specific configuration of FIG. 18.

More specifically, as shown in FIG. 19, the coding section core produces indexes IN1 and IN2 corresponding to the first and second areas AR1 and AR2 by means of two logic operation sections 51 and 52, respectively. Also, the coding section core selectively outputs the index IN1 corresponding to the first area AR1 according to a logical value of a selection signal SEL instructing the changeover of the index by means of an AND section 53. Also, the coding section core generates an inversion signal resulting from inverting the logical value of the selection signal SEL by means of an inverter 54, and selectively outputs the index IN2 corresponding to the second area AR2 according to a logical value of the inversion signal by means of an AND section 55. The coding section core obtains logical addition of the output values of the AND sections 53 and 55 with the aid of an OR section 56, and changes over the generation of the index so as to correspond to the first and second areas according to the changeover of the selection signal SEL.

The coding section core changes over the motion vector retrieval range to code the moving image data according to the various feature quantities of the moving image data to be coded, and also changes over the configurations of the area that is stored in the cache memory in the first and second areas AR1 and AR2 in association with the changeover of the motion vector retrieval range. The feature quantities can be, for example, a hit ratio of the cache memory in a previous frame, a distribution of the motion vector to be detected by the previous frame, or the like. For example, in the case where the hit ratio of the cache memory in the previous frame is equal to or lower than a given value, it is conceivable to change over the present motion vector retrieval range. Also, for example, when most of the motion vectors that are detected by the previous frame are small in the horizontal components and large in the vertical components in a state where the motion vector is detected in the laterally long motion vector retrieval range, there is a case in which the motion vector retrieval range changes over to the vertically long range. In those methods, resultantly, the configuration of the area of the reference image data which is stored in the cache memory is set in the present frame from the tendency in the previous frame.

Instead of the feature quantity of the moving image data, the retrieval range may change over according to an instruction from a user, and the configuration of the area of the reference image data that is stored in the cache memory may change over in conjunction with it.

According to this embodiment, in the coding device, the configuration of the area of the reference image data that is stored in the cache memory changes over, thereby enabling the moving image data to be coded efficiently with a further improvement in the hit ratio.

(7) Embodiment 5

In this embodiment, the present invention is applied to a coding device of moving image data, which changes over a system between an MPEG-4AVC/ITU-T H. 264 system and an MPEG2 system, thereby changing over a configuration of a area that is stored in a cache memory in conjunction with changeover of a coding system. The coding device according to this embodiment is identical in a configuration with the coding device in the embodiment 4 except that the configuration related to the configuration changeover of the area which is stored in this cache memory is different.

Here, in the MPEG-4AVC/ITU-T H. 264 system, it is general to increase a hit ratio when the configuration of the area that is stored in the cache memory is set to a configuration close to a square configuration. On the contrary, in the case of the MPEG 2 system, the hit ratio is higher when the configuration of the area is laterally longer as compared with a case of the MPEG-4AVC/ITU-T H. 264 system.

Therefore, in the coding device according to this embodiment, when a user instructs a coding process of the MPEG-4AVC/ITU-T H. 264 system, reference image data is stored in the cache memory in the square configuration of 16 pixels×16 pixels. On the contrary, when the user instructs the coding process of the MPEG2 system, the reference image data is stored in the cache memory in the laterally longer configuration of 16 pixels×8 pixels.

According to this embodiment, the configuration of the area of the reference image data which is stored in the cache memory changes over according to the coding system, thereby enabling the moving image data to be coded efficiently with a further improvement in the hit ratio.

(8) Embodiment 6

In this embodiment, the present invention is applied to a decoding device of moving image data using the MPEG-4AVC/ITU-T H. 264 system as in the embodiment 2, thereby appropriately changing over a configuration of an area that is stored in a cache memory as in the embodiment 5. The coding device according to this embodiment is identical in the configuration with the decoding device of the embodiment 2 except that a configuration related to this cache memory is different.

That is, similarly, in this embodiment, a first area AR1 of 16 pixels×8 pixels and a second area AR2 of 8 pixels×16 pixels are prepared as the area of reference image data D16 that is stored in the cache memory in the same manner as that described above with reference to FIG. 17.

Figure 20:
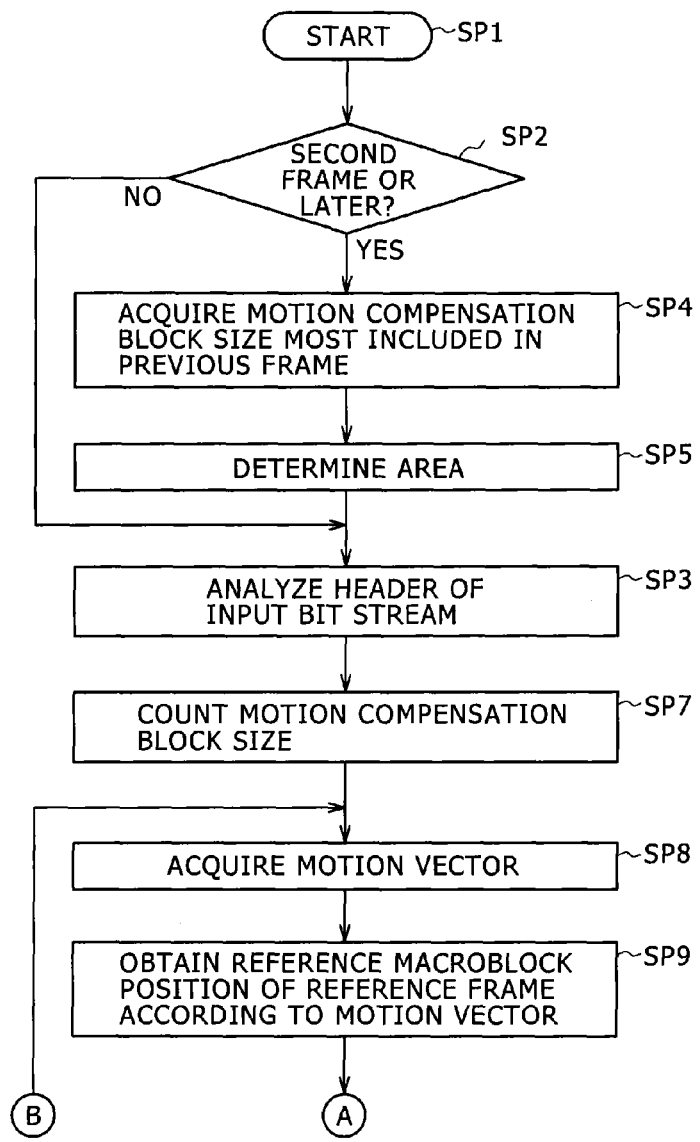
FIG. 20 is a flowchart showing a treatment procedure of a decoding section core in a decoding device according to an embodiment 5 of the present invention.
Figure 21:
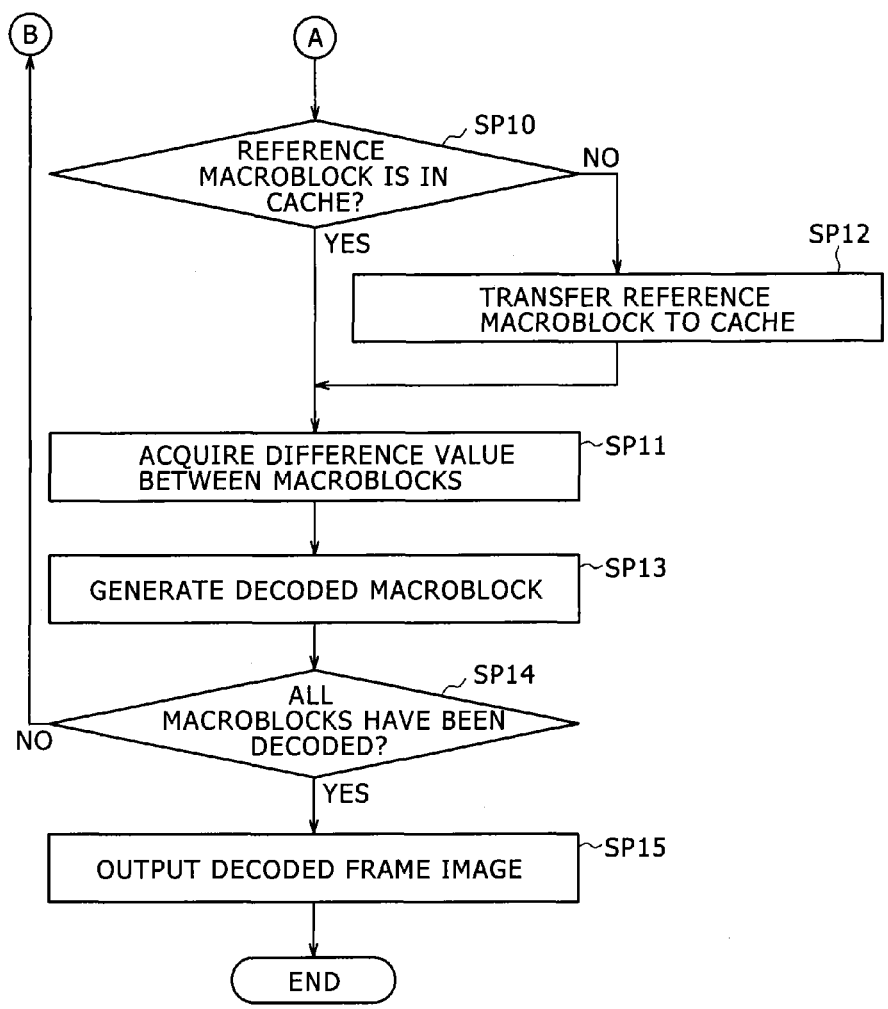
FIG. 21 is a flowchart showing a continuation of FIG. 20.

A decoding section core 31 executes a procedure of FIGS. 20 and 21 in a frame unit, and sets the area of the reference image data D16 that is stored in the cache memory to the first or second area AR1 or AR2 in the frame unit.

That is, when the above procedure starts, the decoding section core 31 shifts from Step SP1 to Step SP2, and determines whether the present frame is a second frame of moving image data or later, or not. In this case, when a negative result is obtained, the decoding section core 31 sets the area of the reference image data D16 which is stored in the cache memory to the first or second area AR1 or AR2 which has been set in advance, and shifts to Step SP3.

On the contrary, when a positive result is obtained in Step S2, the decoding section core 31 shifts from Step SP2 to Step SP4. Here, the decoding section core 31 detects motion compensation block size that has been most detected in the previous frame. Also, in subsequent Step SP5, the decoding section core 31 selects an area that satisfies the motion compensation block size that has been most detected from the area AR1 or AR2. More specifically, in the case where the motion compensation block size that has been most detected is laterally longer, the decoding section core 31 selects the first area AR1 of 16 pixels×8 pixels. Also, in the case where the motion compensation block size that has been most detected is vertically longer, the decoding section core 31 selects the second area AR2 of 8 pixels×16 pixels. The decoding section core 31 sets the selected area to the area of the reference image data D16 which is stored in the cache memory, and shifts to Step SP3.

In Step SP3, the decoding section core 31 analyzes a header of an input bit stream, and acquires information such as a picture type to give notice to a reproduction control section 25. Also, in subsequent Step SP7, the decoding section core 31 counts up the motion compensation block size for each of kinds. The decoding section core 31 determines the count results of the Step SP7 in the process of Step SP4 in a subsequent frame, and decides the area of the reference image data D16 which is stored in the cache memory in a subsequent frame.

Subsequently, the decoding section core 31 shifts to Step SP8, detects a motion vector, and calculates a position of a reference image data that generates a predicted value on the basis of the motion vector which has been detected in Step SP8 in subsequent Step SP9. Here, since the reference image data of a position which is obtained through the calculation is reference image data included in an area having a size corresponding to a macroblock to be processed, the reference image data is called "reference macroblock" in the following description.

Subsequently, the decoding section core 31 shifts to Step SP10, and determines whether the reference macroblock exists in the cache memory, or not, and when the reference macroblock exists in the cache memory, the decoding section core 31 generates a predicted value according to the reference macroblock in the cache memory, and shifts to Step SP11. On the contrary, when no reference macroblock exists in the cache memory, the decoding section core 31 shifts to Step SP12, transfers the reference macroblock to the cache memory from the reference image memory, and generates the predicted value according to the transferred reference macroblock to shift to Step SP11.

In Step SP11, the decoding section core 31 sequentially subjects the macroblock to be processed of the input bit stream to a variable length decoding process, an inverse quantization process, and an inverse discrete cosine transform process to generate a differential error value, and adds the predicted value to the differential error value to decode the moving image data of the subject macroblock in subsequent Step SP13.

The procedure of those Steps SP7, SP8, SP9, SP10, SP11, and SP13, and the procedure of Steps SP7, SP8, SP9, SP10, SP12, SP11, and SP13 are a case of an inter-frame coding process, and in the case of an in-frame coding process, instead of this procedure, the predicted value is generated by in-plane prediction to decode the moving image data.

Upon completion of the process of Step SP13, the decoding section core 31 shifts to Step SP14, determines whether the process of all the macroblocks of the present frame has been completed, or not, and when a negative result is obtained, the decoding section core 31 returns to Step SP8. On the contrary, when a positive result is obtained in Step SP14, the decoding section core 31 shifts from Step SP14 to Step SP15, and after outputting the moving image data of the present frame to be decoded, the decoding section core 31 shifts to Step SP16 to complete the above procedure.

According to this embodiment, on the basis of the past processing result, the configuration of the area of the reference image data D16 which is stored in the cache memory changes over to the configuration that is assumed to be high in the hit ratio to the cache memory, more specifically, changes over to the configuration corresponding to generation units that are predicted to be many in the present frame on the basis of tendency of the generation units of the predicted value in the previous frame, thereby enabling the decoding process to be executed efficiently with a further improvement in a hit ratio.

(9) Embodiment 7

In this embodiment, the present invention is applied to a decoding device of moving image data, which changes over a system between an MPEG-4AVC/ITU-T H. 264 system and an MPEG 2 system, thereby changing over a configuration of an area that is stored in a cache memory in conjunction with changeover of this coding system. The decoding device according to this embodiment is identical in a configuration with the decoding device of the embodiment 2 except that a configuration related to configuration changeover of the area which is stored in the cache memory is different.

Here, as shown in FIGS. 22(A) and 22(B), in the MPEG2, two kinds of 16 pixels×16 pixels and 16 pixels×8 pixels are provided as predicted value generation units. On the contrary, as shown in FIGS. 23(A) to 23(G), in the MPEG-4AVC/ITU-T H. 264, seven kinds of 16 pixels×16 pixels, 16 pixels×8 pixels, 8 pixels×16 pixels, 8 pixels×8 pixels, 4 pixels×8 pixels, 8 pixels×4 pixels, and 4 pixels×4 pixels are provided as the predicted value generation units.

Correspondingly, in the decoding device, when an input bit stream to be processed is of the MPEG 2 system, the cache memory is configured by two ways, an area AR1 of 16 pixels×8 pixels is selected as shown in FIG. 24(A), and reference image data is stored in the cache memory. On the contrary, when the input bit stream to be processed is of the MPEG-4AVC/ITU-T H. 264 system, the cache memory is configured by one way, and an area AR2 of 16 pixels×8 pixels is selected as shown in FIG. 24(B), and the reference image data is stored in the cache memory.

FIG. 25 is a flowchart showing procedure of a decoding section core 31 related to the changeover of this cache memory. When starting a decoding process, the decoding section core 31 executes the procedure. That is, when the procedure starts, the decoding section core 31 shifts from Step SP21 to Step SP22, and here analyzes the input bit stream to detect the kind of codec. Also, the decoding section core 31 determines whether the kind of detected codec is MPEG2, or not.

Here, when a positive result is obtained, the decoding section core 31 shifts from Step SP22 to Step SP23, and sets an area of reference image data D16 which is stored in the cache memory to the first area AR1. Also, the decoding section core 31 shifts to subsequent Step SP24, and after instructing processing start of the codec to the respective sections, the decoding section core 31 shifts to Step SP25 to complete the procedure.

On the contrary, when a negative result is obtained in Step SP22, the decoding section core 31 shifts from Step SP22 to Step SP26, and after setting the area of the reference image data D16 which is stored in the cache memory to the second area AR2, the decoding section core 31 shifts to Step SP24.

According to this embodiment, the configuration of the area of the reference image data which is stored in the cache memory changes over according to the coding system, thereby enabling the moving image data to be decoded efficiently with a further improvement in the hit ratio.

(10) Embodiment 8

In this embodiment, the present invention is applied to a coding and decoding device. Here, the coding and decoding device according to this embodiment is so configured as to change over a program of arithmetic processing means that constitutes the above-mentioned decoding section core 31 in FIG. 3, and changes over its configuration between the coding device and the decoding device according to the changeover of the program.

Also, when the coding and decoding device is operated as the coding device, the moving image data is sequentially coded by the configuration related to the cache memory of the coding device according to the above-mentioned embodiment. Also, when the configuration is made as the decoding device, the moving image data is sequentially decoded by the configuration related to the cache memory of the decoding device according to the above-mentioned embodiment. Accordingly, the coding and decoding device according to this embodiment changes over a configuration of an area of reference image data which is stored in the cache memory between a case of coding and a case of decoding.

According to this embodiment, the configuration of the area of the reference image data which is stored in the cache memory changes over between the case of coding and the case of decoding, thereby enabling the moving image data to be coded and decoded efficiently with a further improvement in a hit ratio.

(11) Embodiment 9

In this embodiment, the present invention is applied to a coding and decoding device, an area that is stored in a cache memory is set in the same manner as that of the above-mentioned respective embodiments, and also the configuration of the area changes over. In this embodiment, this cache memory is configured by 128 ways. Also, each of the ways is set to a capacity for 16 or 32 read units (for 2 words or 4 words when 8 pixels×8 pixels are one word) of the reference image data from the reference image memory. Also, this cache memory is configured so that setting of an index for the reference image data for 2 words or 4 words is omitted, and the reference image data which is stored in each of the ways can be specified by a tag of each way. For that reason, in the cache memory, address data of the reference image memory for 8 leading pixels which are stored in each of the ways is set in each of the tags. Accordingly, in this embodiment, it is determined whether the reference image data corresponding to the cache memory is stored, or not, according to the comparison of the address data that accesses to the cache memory and the tag that is set in the cache memory. Also, when the reference image data corresponding to the cache memory is not stored, loading is executed from the reference image memory to generate a predicted value and also store the predicted value in the cache memory, and the address of the 8 leading pixels is set to the tag.

Even if the number of ways increases, and the reference image data is identified by only the tag instead of the index as in this embodiment, the same advantages as those in the above-mentioned embodiments can be obtained.

(12) Other Embodiments

In the above-mentioned embodiments, a case in which the unit of reading the reference image data from the reference image memory is 8 pixels continuous in the horizontal direction has been described. However, the present invention is not limited to this. The number of pixels of the read unit which are continuous in a horizontal direction can be variously set. Also, the present invention can be widely applied to a case in which a plurality of pixels continuous in a vertical direction is the read unit instead of the plurality of pixels continuous in the horizontal direction.

Also, in the above-mentioned embodiments, a case in which the configuration of the area of the reference image data which is stored in the cache memory changes over according to the process of the moving image data has been described. However, the present invention is not limited to this. For example, the configuration of the area of the reference image data which is stored in the cache memory can change over according to the moving image data when the configuration of the area changes over in the case where the moving image data is of an interlace system and of a progressive system or when the configuration of the area changes over according to the frame rate, or the like.

Also, in the above-mentioned embodiments, a case in which the respective function blocks are configured by the arithmetic processing means to process the moving image data has been described. However, the present invention is not limited to this. The present invention can be widely applied to a case in which the moving image data is processed by a hardware configuration.

Also, in the above-mentioned embodiments, a case in which the moving image data is processed in the MPEG-4AVC/ITU-T H. 264 system and the MPEG 2 system has been described. However, the present invention is not limited to this. The present invention can be widely applied to a case in which the predicted value is generated from the reference image data that is held in the reference image memory to process the moving image data in a format other than the above systems.

Industrial Applicability

The present invention can be applied a coding device and a decoding device of moving image data using, for example, an MPEG-4AVC/ITU-T H. 264 system.

The invention claimed is:

1. An image data processing method in which a cache memory is used, a predicted value is generated according to reference image data that is held in a reference image memory, and moving image data is coded and/or decoded with the aid of the predicted value, comprising:

specifying an area of the reference image data on a screen by one-dimensional address data of the reference image memory, and requesting the reference image data that is used for generation of the predicted value from the cache memory;

retrieving reference image data corresponding to the request from the reference image data that is stored in the cache memory, the retrieving including transforming the one-dimensional address data into two-dimensional address data indicative of a position of the reference image data on the screen by selecting a first number of bits of the one-dimensional address data as first two-dimensional address data and selecting a second, non-adjacent portion of the one-dimensional address data having a second number of bits as second two-dimensional address data, the retrieving varying the first number of bits and the second number of bits based on a vertical size and a horizontal size of the area;

generating an index of the cache memory by concatenating the first two-dimensional address data with the second two-dimensional address data such that a last bit of the first two-dimensional address data is directly before a first bit of the second two-dimensional address data in the index;

outputting the reference image data that is stored in the cache memory in response to the request when the corresponding reference image data is stored in the cache memory; and storing the corresponding reference image data that is stored in the reference image memory in the cache memory, and also outputting the corresponding reference image data in response to the request when the corresponding reference image data is not stored in the cache memory, wherein the reference image memory outputs the reference image data in a read unit of a plurality of pixels which are continuous in a horizontal direction or a vertical direction, and wherein the area is an area that is a plurality of the read units in the horizontal direction and the vertical direction, respectively.

2. The image data processing method according to claim 1, wherein the retrieving retrieves an index of the cache memory by using the two-dimensional address data, and retrieves the reference image data corresponding to the request, and the storing sets the two-dimensional address data to the index, and stores the corresponding reference image data in the cache memory.

3. The image data processing method according to claim 1, wherein the specifying changes over the configuration of the area according to the processing of the moving image data.

4. The image data processing method according to claim 3, wherein changeover of the configuration of the area according to the processing of the moving image data is changeover between a case of coding the moving image data and a case of decoding the moving image data.

5. The image data processing method according to claim 3, wherein the changeover of the configuration of the area according to the processing of the moving image data is changeover according to a system of coding and/or decoding the moving image data.

6. The image data processing method according to claim 3, wherein the changeover of the configuration of the area according to the processing of the moving image data is changeover to a configuration that is assumed to be high in a hit ratio to the cache memory on the basis of a past processing result.

7. The image data processing method according to claim 6, wherein the changeover to the configuration that is assumed to be high in the hit ratio to the cache memory is changeover to a configuration corresponding to generation units which are predicted to be many in a present frame from a tendency of the generation unit of the predicted value in a previous frame.

8. The image data processing method according to claim 1, wherein the retrieving varies the first number of bits and the second number of bits while maintaining a sum of the first number of bits and the second number of bits to be a constant number of bits.

9. The image data processing method according to claim 1, wherein the retrieving reduces the first number of bits and increases the second number of bits when the horizontal size of the area is greater than the vertical size of the area.

10. The image data processing method according to claim 1, wherein the retrieving increases the first number of bits and decreases the second number of bits when the vertical size of the area is greater than the horizontal size of the area.

11. A non-transitory computer readable recording medium that records a program for an image data processing method in which a cache memory is used, a predicted value is generated according to reference image data that is held in a reference image memory, and moving image data is coded and/or decoded with the aid of the predicted value, the image data processing method comprising:
    specifying an area of the reference image data on a screen by one-dimensional address data of the reference image memory, and requesting the reference image data that is used for generation of the predicted value from the cache memory;
    retrieving reference image data corresponding to the request from the reference image data that is stored in the cache memory, the retrieving including transforming the one-dimensional address data into two-dimensional address data indicative of a position of the reference image data on the screen by selecting a first number of bits of the one-dimensional address data as first two-dimensional address data and selecting a second, non-adjacent portion of the one-dimensional address data having a second number of bits as second two-dimensional address data, the retrieving varying the first number of bits and the second number of bits based on a vertical size and a horizontal size of the area;
    generating an index of the cache memory by concatenating the first two-dimensional address data with the second two-dimensional address data such that a last bit of the first two-dimensional address data is directly before a first bit of the second two-dimensional address data in the index;
    outputting the reference image data that is stored in the cache memory in response to the request when the corresponding reference image data is stored in the cache memory; and
    storing the corresponding reference image data that is stored in the reference image memory in the cache memory, and also outputting the corresponding reference image data in response to the request when the corresponding reference image data is not stored in the cache memory,
    wherein the reference image memory outputs the reference image data in a read unit of a plurality of pixels which are continuous in a horizontal direction or a vertical direction, and wherein the area is an area that is a plurality of the read units in the horizontal direction and the vertical direction, respectively.

12. The medium according to claim 11, wherein the retrieving varies the first number of bits and the second number of bits while maintaining a sum of the first number of bits and the second number of bits to be a constant number of bits.

13. The medium according to claim 11, wherein the retrieving reduces the first number of bits and increases the second number of bits when the horizontal size of the area is greater than the vertical size of the area.

14. The medium according to claim 11, wherein the retrieving increases the first number of bits and decreases the second number of bits when the vertical size of the area is greater than the horizontal size of the area.

15. An image data processing device that uses a cache memory, generates a predicted value according to reference image data that is held in a reference image memory, and codes and/or decodes moving image data with the aid of the predicted value, comprising:
    a reference image data request section that specifies an area of the reference image data on a screen by one-dimensional address data of the reference image memory, and requests the reference image data that is used for generation of the predicted value from the cache memory;
    a cache memory retrieval section that retrieves reference image data corresponding to the request from the reference image data that is stored in the cache memory, the cache memory retrieval section transforming the one-dimensional address data into two-dimensional address data indicative of a position of the reference image data on the screen by selecting a first number of bits of the one-dimensional address data as first two-dimensional address data and selecting a second, nonadjacent portion of the one-dimensional address data having a second number of bits as second two-dimensional address data, the cache memory retrieval section varying the first number of bits and the second number of bits based on a vertical size and a horizontal size of the area, the cache memory retrieval section generating an index of the cache memory by concatenating the first two-dimensional address data with the second two-dimensional address data such that a last bit of the first two-dimensional address data is directly before a first bit of the second two-dimensional address data in the index;
    a first reference image data output section that outputs the reference image data that is stored in the cache memory in response to the request when the corresponding reference image data is stored in the cache memory; and
    a second reference image data output section that stores the corresponding reference image data that is stored in the reference image memory in the cache memory, and also outputs the corresponding reference image data in response to the request when the corresponding reference image data is not stored in the cache memory, wherein the reference image memory outputs the reference image data in a read unit of a plurality of pixels which are continuous in a horizontal direction or a vertical direction, and wherein the area is an area that is a plurality of the read units in the horizontal direction and the vertical direction, respectively.

16. The image data processing device according to claim 15, wherein the cache memory retrieval section varies the first number of bits and the second number of bits while maintaining a sum of the first number of bits and the second number of bits to be a constant number of bits.

17. The image data processing device according to claim 15, wherein the cache memory retrieval section reduces the first number of bits and increases the second number of bits when the horizontal size of the area is greater than the vertical size of the area.

18. The image data processing device according to claim 15, wherein the cache memory retrieval section increases the first number of bits and decreases the second number of bits when the vertical size of the area is greater than the horizontal size of the area.

* * * * *